United States Patent [19]

Goldfischer et al.

[11] 4,216,473
[45] Aug. 5, 1980

[54] MIPS HOVER ATTACHMENT

[75] Inventors: Lester I. Goldfischer, New Rochelle, N.Y.; Gus Stavis, Wayne; Abraham Shrekenhamer, West Paterson, both of N.J.

[73] Assignee: The Singer Company, Little Falls, N.J.

[21] Appl. No.: 961,315

[22] Filed: Nov. 16, 1978

[51] Int. Cl.² ............................................. G01S 9/44
[52] U.S. Cl. ..................................................... 343/8
[58] Field of Search ............... 343/5 CM (U.S. only), 343/8 (U.S. only)

[56] References Cited

U.S. PATENT DOCUMENTS

| | | | |
|---|---|---|---|
| 3,020,539 | 2/1962 | Gruenberg | 343/8 X |
| 3,178,711 | 4/1965 | Case, Jr. | 343/5 CM X |
| 3,838,424 | 9/1974 | Goldfischer | 343/8 |
| 3,974,500 | 8/1976 | Goldfischer | 343/8 |
| 4,034,373 | 7/1977 | de Pierre et al. | 343/7.7 |
| 4,121,210 | 10/1978 | Goldfischer | 343/8 |
| 4,134,113 | 1/1979 | Powell | 343/5 CM |

*Primary Examiner*—Malcolm F. Hubler
*Attorney, Agent, or Firm*—L. A. Wright

[57] ABSTRACT

An attachment is provided for aircraft, and particularly for helicopters, for use in conjunction with a microwave interference pattern sensor (MIPS) system, to sense low velocities, for example, such as are encountered when the helicopter is in a hover mode. The attachment includes an antenna array which is separated from the MIPS antenna array, and which comprises two sets of transmitting and two pairs of receiving antenna horn apertures mounted in orthogonal relationship with one another, the transmitting apertures of each set being scanned in sequence to produce a moving energy pattern which is intercepted by the receiving antenna apertures of the attachment, even though the aircraft is stationary.

14 Claims, 9 Drawing Figures

MIPS HOVER ATTACHMENT

BACKGROUND OF THE INVENTION

Microwave interference pattern velocity sensor (MIPS) systems are described in U.S. Pat. Nos. 3,838,424 and 3,974,500, both of which issued in the name of Lester I. Goldfischer, one of the present inventors, and both of which are assigned to the present assignee. Back scattered continuous wave radar energy is speckled, consisting of bright and dark spots arranged in a random pattern, and the MIPS systems described in the patents use this phenomenon to achieve velocity sensing.

The MIPS system is usually installed in aircraft, and it employs a continuous wave radar system which illuminates the ground below the aircraft with radar energy. The radar system produces a speckle pattern which moves at the same speed as the aircraft, but in the opposite direction. When the speckle pattern is traversed by a pair of identical receiving antennas on the aircraft having a known fixed separation, the two receiving antennas sense identical variations in power, except for a delay which is inversely proportional to the velocity of the aircraft. Accordingly, signals may be produced by the MIPS system which are indicative of the aircraft velocity, for example, with respect to the heading axis of the aircraft.

When used in a conventional aircraft, or in a moving helicopter, the MIPS transmitting and receiving antennas are transported with the vehicle. As a result of its being illuminated by the transmitter antenna, the terrain beneath the aircraft reradiates part of the incident power. Rather than being uniform, the back scattered radiation is randomly speckled in character, as mentioned above. As described, two receiving antennas are used at a fixed displacement from one another, and the speckles sweep past the two MIPS receiving antennas at twice the vehicle speed relative to the ground, creating two nearly identical, noise-like waveforms in the two receiving antennas which differ only in time displacement relative to one another.

The power spectral densities of the two waveforms are, likewise, nearly the same, each having a low pass structure with bandwidth determined by the combination of the transmitter and receiver beam width and the velocity of flight, the relationship of beam width to velocity being one of linear proportion. Since the two receiving antennas of the MIPS system have a fixed separation, the time displacement, or delay, between their two waveforms is inversely proportional to velocity. This delay also appears as a relative phase difference between components of the two waveforms at the same frequency, the magnitude of the phase being proportional to the product of the particular frequency and the delay.

The essential feature of the MIPS system is to combine the two received waveforms in two different ways such that the power spectral densities of the two resultants are the same only at certain critical frequencies which are proportional to velocity. For example, if the sum of the two received signals is created in one channel and the difference in a second channel, the power spectral densities of the two will be equal only at those frequencies where the phase difference of the components of the original signals is an odd multiple of $\pi/2$ radians. From this last fact, and from the fact that the phase difference is proportional to the product of delay and the particular frequency, and since the delay is inversely proportional to velocity, it is clear that the frequencies at which the combination spectra have equal densities are directly proportional to velocity. Denoting the frequencies of equal density as "crossover frequencies", one of these frequencies is tracked in the MIPS system by causing a variable narrow band filter to move its center frequency, through the action of a feedback loop, until it intercepts the same amount of power from the sum spectrum as it does from the difference spectrum.

Copending application Ser. No. 811,109, now U.S. Pat. No. 4,121,210, filed in the name of Lester I. Goldfischer, and assigned to the present assignee, discloses a two-dimensional velocity sensing system which uses MIPS principles, and which is intended to be mounted in an aircraft to determine its heading and cross-heading velocities. The system of the copending application, as is the case with the systems described in the U.S. Pat. Nos. 3,838,424 and 3,974,500, uses a continuous wave radar system to illuminate the ground directly below the aircraft with a monochromatic radar beam. In the particular system of the application, however, the radar beam is radiated from two transmitting horns which are mounted at a predetermined angle on either side of the aircraft heading axis. The two transmitting horns are activated alternately, and they cause the speckle pattern to move at the same speed as the aircraft, but in the opposite direction. A pair of receiving horns is mounted at a predetermined separation to lie parallel to the heading axis in a position to traverse the speckle pattern. These receiving horns sense identical variations in power in the speckle pattern, except for a delay which, as in the systems described in the patents, is inversely proportional to the velocity of the aircraft. The sensed delay is processed in an appropriate airborne computer to provide readings corresponding to the heading velocity and cross-heading velocity of the aircraft.

The MIPS systems described above may be coupled to the auto pilot of the aircraft, to provide an appropriate control for the auto pilot. However, the above-described MIPS systems have a very flow refresh rate at low velocities of the aircraft, and this makes the system unsuited for the control of the auto pilot at low velocities, for example when the aircraft is in a hover mode. The attachment of the present invention is intended to be used in conjunction with the MIPS systems to provide low velocity sensing capabilities, for example, when the aircraft is in a hover mode.

The usual MIPS systems do not function efficiently in a hovering helicopter, for example, because, at zero velocity, all spectrum bandwidths collapse to zero and the sensed delay from which velocities are determined become infinite. It is, accordingly, an objective of the present invention to provide an attachment for the MIPS systems which permits operation of the systems over a range of positive and negative locities around, and including, hover. This objective is achieved by scanning the array of transmitting antenna apertures of the attachment which create the effect of vehicle motion. The resulting speckle pattern appears to move over the two receiving antenna apertures of each antenna array of the attachment as they would due to actual vehicle motion.

In order to fill in the spectrum of the received signals at hover, the scanning frequency is preferably varied above and below its center value. Thus, at hover, the tracking bandpass filter need not be infinitesimally narrow and the system response time may be kept reasonably short.

The MIPS hover attachment of the invention preferably includes two sets of transmitting antenna apertures with orthogonal scan directions and two pairs of receiving apertures, one for each set. The lines connecting the two horns of each receiving antenna pair are also disposed at right-angles and respectively aligned with the two orthogonal transmitting scan directions. With such an assembly, two orthogonal components of velocity may be sensed. Since the two sets of transmitting antenna arrays and receiving antenna pairs are identical, except for direction, only one such group will be described in detail in the ensuing description.

DETAILED DESCRIPTION OF THE ILLUSTRATED EMBODIMENT

The physical basis behind the operation of any correlation velocity sensor is the existence of a randomly speckled spatial pattern in the power back-scattered by the terrain upon illumination by a monochromatic radar beam, as explained above. As pointed out, motion of the transmitting antenna in any one direction causes the pattern, as observed in the plane of motion, to move as a whole in the opposite direction and at the same speed as the transmitting antenna. When the pattern is traversed by a pair of identical receiving antennas whose separation is fixed, the two receiving antennas sense identical variations in power except for a delay which is inversely proportional to velocity. In the MIPS system, the delay between the two power waveforms is measured directly and its inverse is computed to determine the velocity of the vehicle in which the radar transmitter is installed.

An understanding of the MIPS system requires that the noise-like power variations sensed by the two receiving horns be decomposed into their spectral components. Since, in the absence of receiver noise, the two waveforms are identical except for a time delay, their power spectral densities will also be identical, both being low pass, but corresponding components at the same frequency will differ in phase. In the frequency in question is f and the phase difference is designated a $\theta$, then:

$$\theta = 2\pi f \tau$$

where $\theta$ is in radians, f is in Hertz and $\tau$ is the time delay between the two waveforms in seconds.

Figure 1:
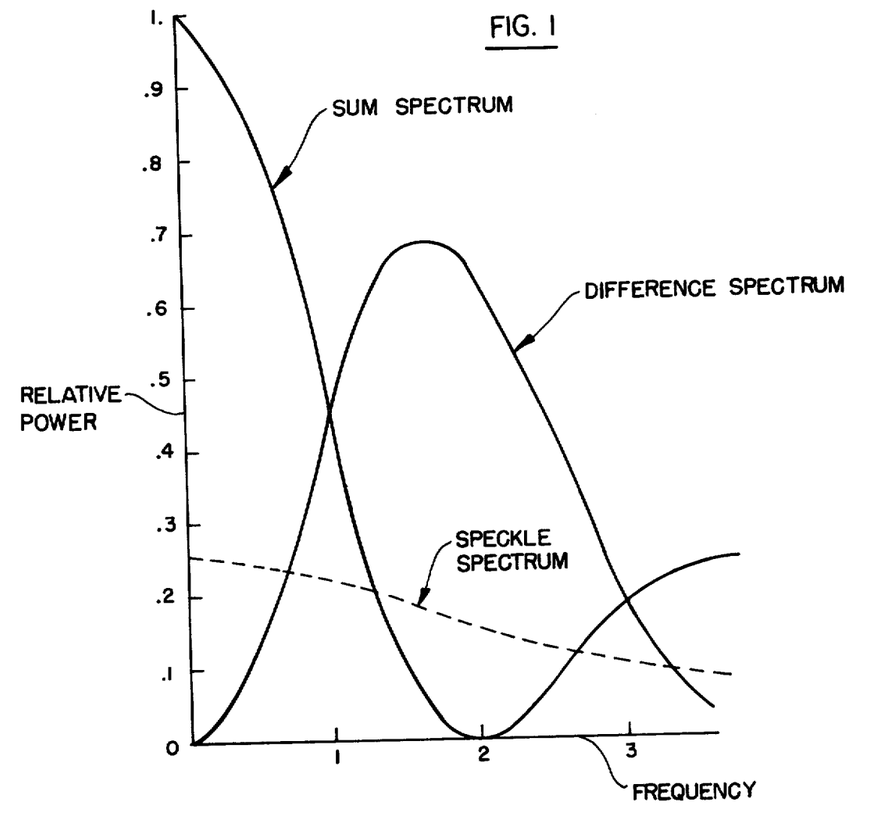
FIG. 1 is a series of curves representing the MIPS spectra, and useful in understanding the principles of the MIPS system.

As a result of the foregoing variation of phase with frequency, the spectra of the sum and of the difference of the power variations sensed by the two receiving antennas have the forms shown in FIG. 1. The speckle spectrum of either received power waveform is also shown in FIG. 1 for comparison purposes. The components of the two waveforms at zero frequency are exactly in phase. Hence, the power in the sum of these components is four times the power in either component separately, and the power in the difference between the components vanishes. Letting the frequency of the components in question increase brings a corresponding increase in the relative phase between them, causing the power in their sum to diminish while the power in their difference increases. When the frequency has risen to a value $$f_c = 1/(4\tau),$$

the relative phase between the two components becomes $$\theta_c = 2\pi(\tfrac{1}{4}\tau)\tau = \pi/2$$

and the power of their sum is the same as the power of their difference, causing the sum and difference spectra to cross each other as shown in FIG. 1.

The crossover feature is important because of the proportionality between the frequency at which the crossover occurs and the velocity of the aircraft. This presumes only that the distance between the two receiving antennas is fixed, and that transmitting and receiving antennas follows the same straight line path across the speckled pattern of back-scattered power. With the foregoing conditions, and assuming that the receiving antennas are mutually separated by a fixed distance (d), then if the entire antenna assembly is moving at a velocity (V), and since the relative velocity of the pattern is twice as great with respect to the receiving antennas, the time required for a specific point in the pattern to travel between the receiving horns is $$\tau = d/(2V);$$

where: d is given in feet, V is in feet/second.

On that basis, the value of the crossover frequency becomes $$f_c = V/(2d)$$

which shows the proportionality between $f_c$ and V as stated above. Thus, tracking the crossover frequency in this case would yield velocity magnitude directly; and the sense of motion has no effect on the result.

While the approach described above is usable in fixed wing aircraft which are constrained to move principally in the forward direction, the lack of direction sensing does not meet helicopter requirements. One way of remedying the situation involves modulating the speckle pattern waveform onto a fixed carrier. Then, by using a balanced modulator, the low-pass spectrum associated with the original speckle waveform may be transformed into a bandpass spectrum. The bandpass spectrum is symmetrically disposed about the carrier frequency, the upper half of the spectrum being geometrically similar to its low-pass progenitor and the lower half being its mirror image.

In the case where the fore and aft channel speckle waveforms are modulated onto indentical carriers, that is, of the same frequency and phase, and when the antenna assembly is moving in the forward direction, the components of the fore spectrum above the carrier frequency will lead corresponding components of the aft spectrum. However, for those pairs of components below the carrier frequency, the phase relationship will be reversed. When the fore channel carrier is made to lag the aft channel carrier, the entire phase characteristic is lowered by the amount of the lag angle.

Figure 2:
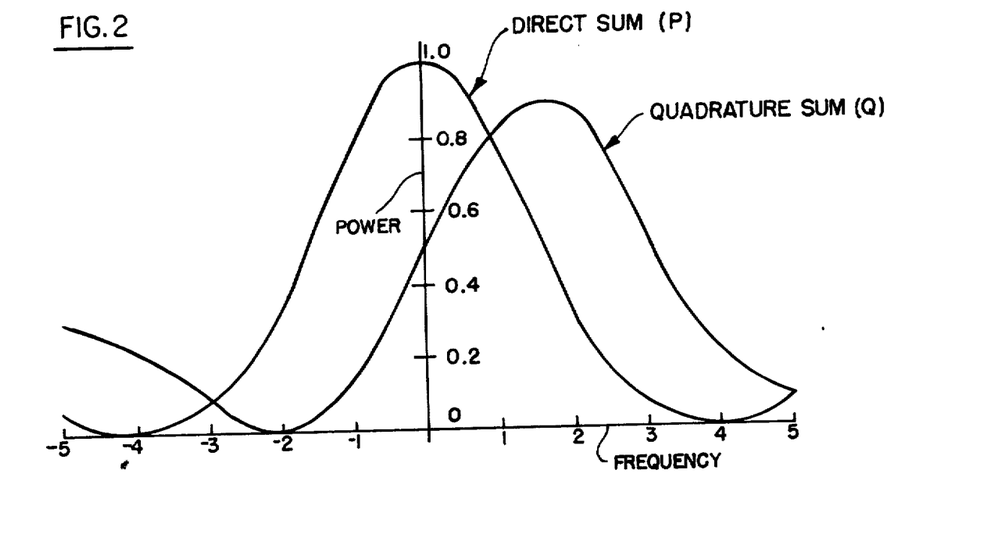
FIG. 2 is a further series of curves representing the MIPS direct sum (P) and quadrature sum (Q) spectra.

The sum of the two modulated versions of the fore and aft spectra using the same carrier is simply a modulated version of the sum spectrum of FIG. 1. It is symmetrically disposed about the carrier and will be referred to as the direct sum (P) spectrum. When the carrier of the fore channel balance modulator is made to lag the carrier of the aft channel modulator 90°, the sum of the resultant modulated waveforms yields a spectrum which is skewed with respect to the carrier. This latter spectrum will be referred to as the quadrature sum (Q) spectrum. Both the P and Q spectra are illustrated in FIG. 2. The frequencies at which the spectra crossings occur are those where the relative phase of the two components which make up the P spectrum is the same as the relative phase of the two components making up the Q spectrum; and the amplitude of the two members of each pair is the same.

Using $f_d$ to denote the frequency displacement of a given spectral component from the carrier, the relative phase between the components entering the direct sum is $$\theta_p = |2\pi f_d \tau|,$$

while the relative phase between the components entering the quadrature sum is $$\theta_q = |2\pi f_d \tau - \pi/2|.$$

As the displacement frequency is increased, going above the carrier, that is for positive $f_d$, the relative phase $\theta_p$ increases from zero, while the relative phase $\theta_q$ decreases from quadrature, equality being reached when $$\theta_p = \theta_q = \pi/4.$$

The displacement frequency at which the foregoing occurs is termed the first order crossover frequency; it is given by $$f_x = 1/(8\tau) = V/(4d).$$

On the other side of the carrier frequency, that is below the carrier frequency, it is preferable to view the relative phase between the two components in terms of angle by which the aft channel components leads the fore channel component. To accomplish this, $$\theta_q = |2\pi f_d \tau - \pi/2 + 2\pi| = |2\pi f_d \tau + 3\pi/2|.$$

Since the relative phases at the crossover are three times as large as at the first order crossover, the displacement frequency here is $(3f_x)$. This is termed the third-order crossover frequency.

It is important to recognize two significant properties of the first and third crossover frequency displacements; the magnitude of each is directly proportional to velocity and the disposition of the two crossovers relative to the carrier indicates the direction of motion. When the direction is forward, the first order crossover lies above the carrier and the third order crossover lies below the carrier. Conversely, when the direction is rearward, the placement of the crossover relative to the carrier is reversed. Therefore, by tracking the two crossover frequencies and determining when the crossover with the larger displacement is above or below the carrier, both the magnitude and direction of velocity of the aircraft may be obtained.

The foregoing discussion applies, strictly speaking, to a sensor which is constrained to move along a straight line, such as when the MIPS system is mounted in a fixed wing aircraft. Extending the MIPS principles to two-dimensions, the system may be used in other types of aircraft such as helicopters. This is accomplished through the use of pairs of long-thin transmitting antenna horn apertures $T_1$ and $T_2$ (FIG. 3) whose major axes are not colinear, but which extend at an angle on either side of the heading axis of the aircraft, as described in the copending application referred to above. When the terrain illumination is formed by a long-thin aperture, the mean speckle in the back-scattered pattern has the same size and orientation as the transmitting aperture, to a first approximation.

Figure 3:
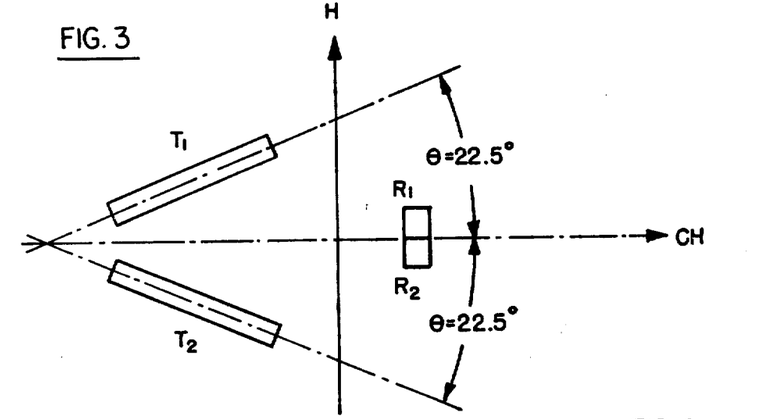
FIG. 3 shows the placement of the transmitting and receiving antenna horns in the MIPS system of the aircraft under consideration, which may be of the type described in the copending application, and which is capable of sensing velocities along the heading and cross-heading axes of the aircraft.

In FIG. 3, as in the system of the copending application, the two transmitting horns $T_1$ and $T_2$, each with a long narrow aperture, are aligned with the aircraft heading axis H, as shown, in position such that the antenna $T_1$ describes an angle $\theta$ above the cross-heading axis CH, and the antenna $T_2$ describes an angle $\theta$ below the cross-heading axis CH. The two receiving horns $R_1$ and $R_2$ have their centers connecting along a line parallel to the heading axis H. The value of $\theta$ used for illustrative purposes in FIG. 1 is 22.5°. The exact magnitude of the angle $\theta$ is not critical.

Figure 4:
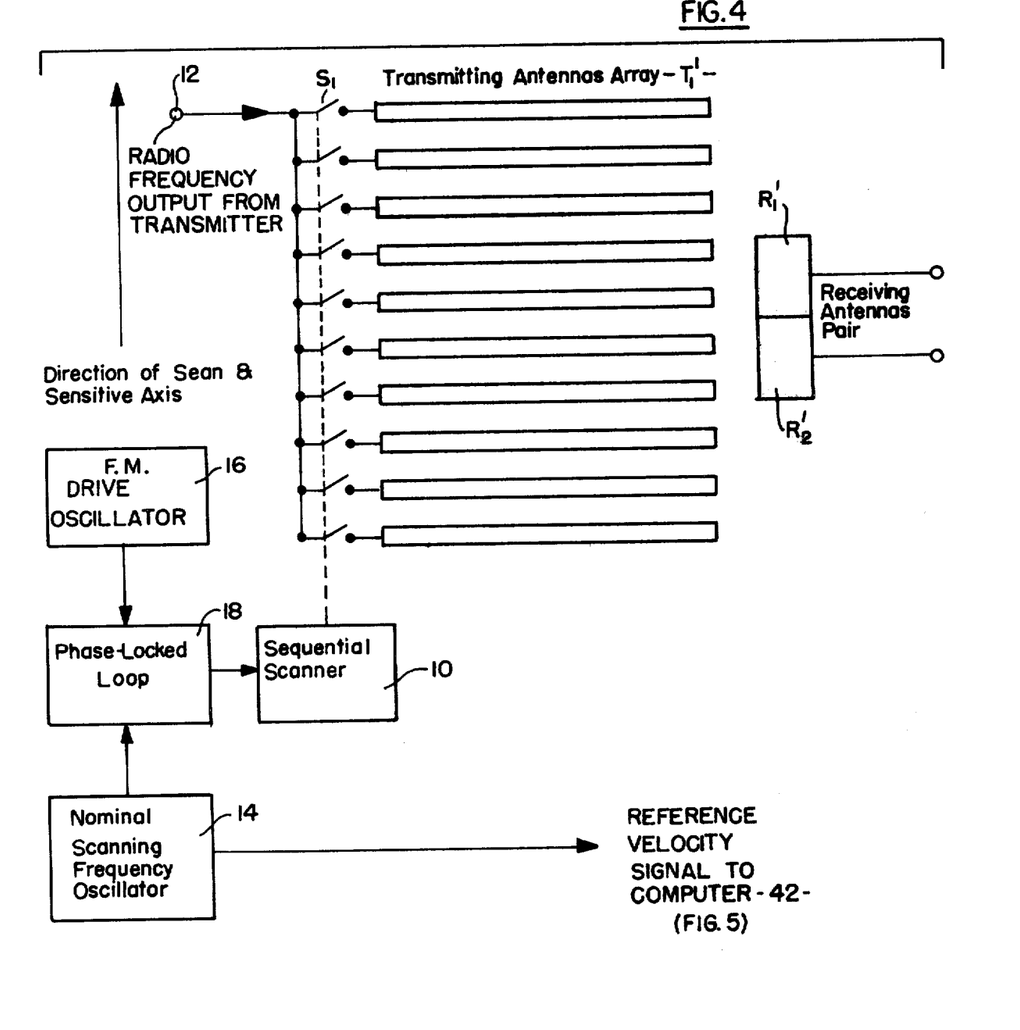
FIG. 4 is a block diagram of one of the two transmitting and receiving antenna arrays utilized in the attachment of the invention, and a block diagram of a system used to effectuate a scanning of the illustrated array, it being understood that for two vector velocity sensing, a second array is also provided which is orthogonally scanned with respect to the illustrated array.

In the schematic representation of FIG. 4, a first transmitting antenna array $T_1'$ is shown, in the form of a set of elongated apertures, which are scanned in the direction shown by the arrow to the left of the set. The transmitting array $T'_1$ a pair of receiving antennas designated $R_1'$ and $R_2'$ are mounted in the illustrated positions. As stated above, a second array of transmitting antennas designated $T_2'$ may also be provided to be scanned in an orthogonal direction with respect to the scanning of the array of FIG. 4. The transmitting antennas of the array $T_2'$ also have a pair of receiving antennas designated $R_1''$ and $R_2''$ associated therewith in the same relative positions, as in the array of FIG. 4.

In FIG. 4, the various antenna horns are provided with appropriate switches designated collectively as S₁, and these switches are sequentially closed by a sequential scanner 10 of any known type, so that the transmitter of the system may be sequentially connected to the various antenna apertures through a terminal 12.

The sequential scanner 10 is driven at a particular center frequency by a scanning frequency oscillator 14, and that frequency is modulated by a frequency modulator drive oscillator 16 through a phase locked loop 18, for the reasons described above. The center frequency generated by oscillator 14 is also supplied to a computer in the system of FIG. 5, as will be described.

The various circuits which make up the blocks 10, 14, 16 and 18 in FIG. 4 are well known, and need not be described in detail herein. It is to be understood that similar circuitry is used to drive the orthogonal transmitting antenna array T₂'.

Figure 5:
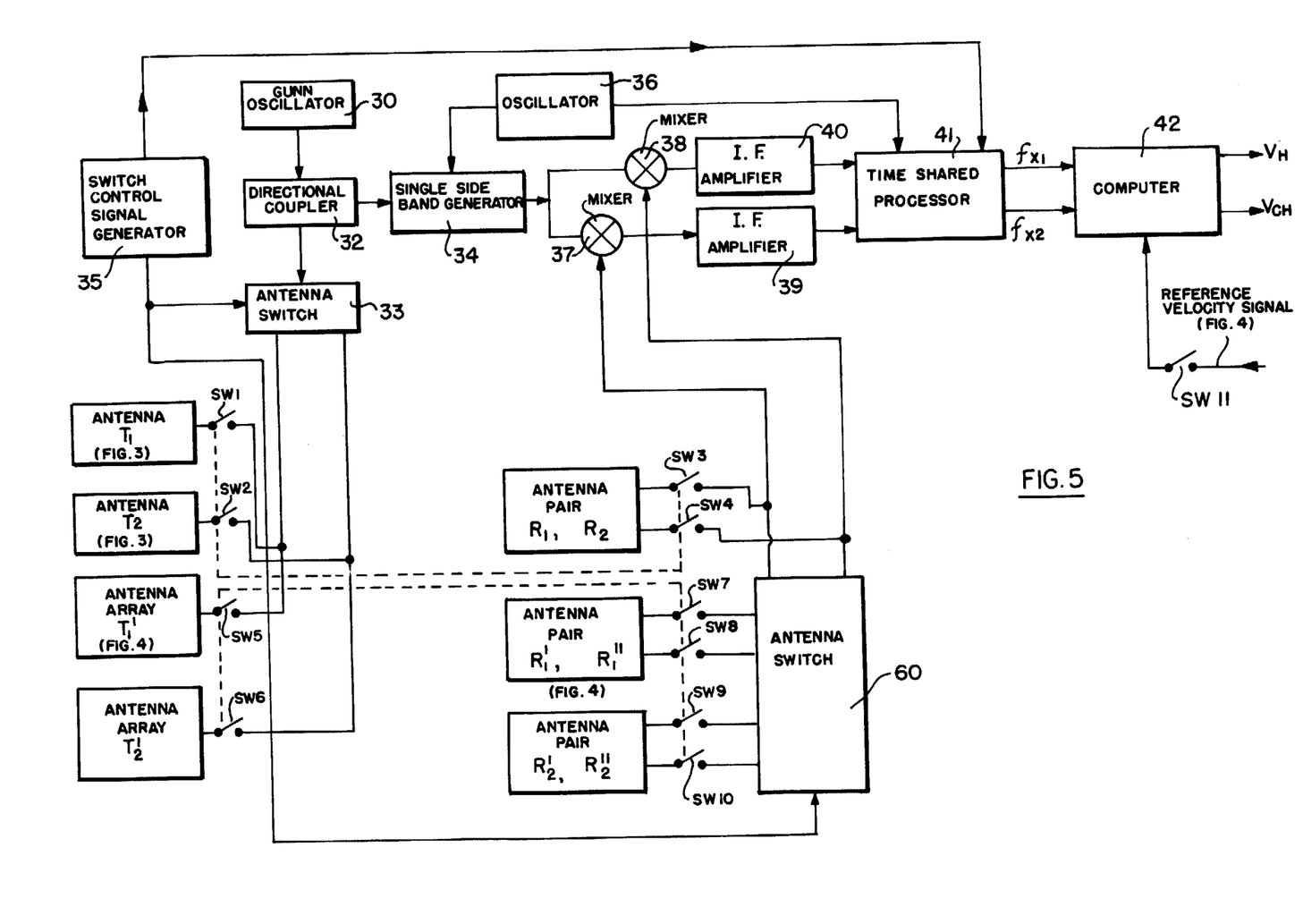
FIG. 5 is a schematic block diagram of a MIPS system which may be switched to sense the signals from the antenna array of FIG. 3 for normal operation, and to sense the signals from the antenna array of FIG. 5 when the aircraft is in a hover mode.

The MIPS system shown in FIG. 5 is intended to operate in one mode in conjunction with the antenna array of FIG. 3, as in the copending application. For that mode, switches SW1, SW2, SW3 and SW4 of FIG. 5 are closed, so that the transmitting antennas T₁ and T₂ of FIG. 3 are connected to the system, as well as the receiving antennas R₁ and R₂.

The system of FIG. 5, in its first mode, as described above, measures two components of horizontal velocity which preferably are orthogonal to one another. This is achieved, as explained in the copending application by using the transmitting horns T₁ and T₂ of FIG. 3, each with a long narrow aperture inclined with the heading axis H, as shown, to describe an angle $\theta$ above the cross-heading axis CH for T₁, and an angle $\theta$ below the cross-heading axis CH, for T₂. As mentioned, the two receiving horns R₁ and R₂ have their centers connected along a line parallel to the heading axis H. The value of $\theta$ used for illustrative purposes in FIG. 3 is 22.5°. However, the exact magnitude of the angle is not critical.

When either transmitting horn T₁ or T₂ is energized, long narrow speckles will be produced. The back-scattered pattern generated by each of the transmitting apertures T₁ and T₂ has elliptical speckles. With such speckles, only the velocity component normal to the axis of the speckle may be sensed, as explained in the copending application.

In the first mode of operation, the two transmitting antenna horns T₁ and T₂ emit a continuous wave radar output signal generated, for example, by a Gunn oscillator 30, which signal is applied to the antennas T₁ and T₂ by way of a directional coupler 32 and an antenna switch 33. Generally, the purpose of the directional coupler 32 is to direct the radar energy to antennas T₁ and T₂, and to attenuate a small portion of the energy to a single side band generator 34 for ultimate use in the receiver section of the system.

An antenna switch 33, under the control of a switch control signal generator 35, alternately switches the output from oscillator 30 to antenna T₁ and antenna T₂, so that the ground beneath the aircraft is illuminated by radar energy from the transmitting antennas T₁ and T₂ in a predetermined sequence. A signal from the switch control signal generator 35 is also applied to a time shared processor 41 in order to synchronize the processor with the particular antenna being activated at any particular time.

The receiver horns R₁ and R₂ traverse the back-scattered return signal, when the system is in its first mode. However, as stated above, although the power of the received signals in the receiver horns is equal, there is a delay between the receipt of the signals due to the spatial separation of the receiver horns.

The received signals are mixed in heterodyne mixers 37 and 38 with a signal from a single side band generator 34 which, is essence, is a local oscillator. An off-set oscillator 36 provides an output to generator 34 and time shared processor 41 in order to avoid antenna leakage frequencies in the receiver section of the system.

The heterodyned signals from mixers 37 and 38 are respectively applied to intermediate frequency amplifiers 39 and 40 for application to the time shared processor 41. In the time shared processor, the crossover frequencies $f_{x1}$ and $f_{x2}$ are generated in the manner described in the patents referred to above. The two signals $f_{x1}$ and $f_{x2}$ are then applied to a computer 42 which, in turn, computes the heading velocity $V_H$ and the cross-heading velocity $V_{CH}$. As described in the copening application, the formulas for computing the heading velocity and the cross-heading velocity are as follows:

$$V_H = K_{11}(f_{x1}+f_{x2}) = K_2 V \cos \delta$$

$$V_{CH} = K_{12}(f_{x1}+f_{x2}) = K_2 V \sin \delta$$

Where:
K is a constant,
V is velocity magnitude, $\delta$ is drift angle,
$f_{x1}$ and $f_{x2}$ are crossover frequencies of the signals received from the receiving horns R₁ and R₂ respectively.

In the second mode of operation of the system of FIG. 1, the switches SW1, SW2, SW3 and SW4 are opened, and switches SW5, SW6, SW7, SW8, SW9 and SW10 are closed. Also, switch SW11 is closed, to introduce the reference velocity signal of FIG. 4 to the computer 42.

In the second mode of operation, the antenna switch 33 sequentially directs the transmitter energy to the antenna array T₁' of FIG. 4 and to the orthogonal antenna array T₂'. At the same time, an antenna switch 60, operated by the switch control signal generator 35 sequentially switches betwen the antenna pair R₁' and R₁" of FIG. 4, and the antenna pair R₂' and R₂" in the orthogonal array.

The system of FIG. 5 operates in its second mode in the same manner as in its first mode, except that in the second mode the computer subtracts the reference velocity signal from the velocity signals derived from the time shared processor 41, so as to generate the proper heading and cross-heading velocity signals.

The transmitting antennas T₁' of FIG. 4, for example, may be a set of parallel linear antenna horns twelve inches long, spaced 0.33 inches, and radiating broadside. As also described, two such sets are required in orthogonal relationship with one another.

Figure 6:
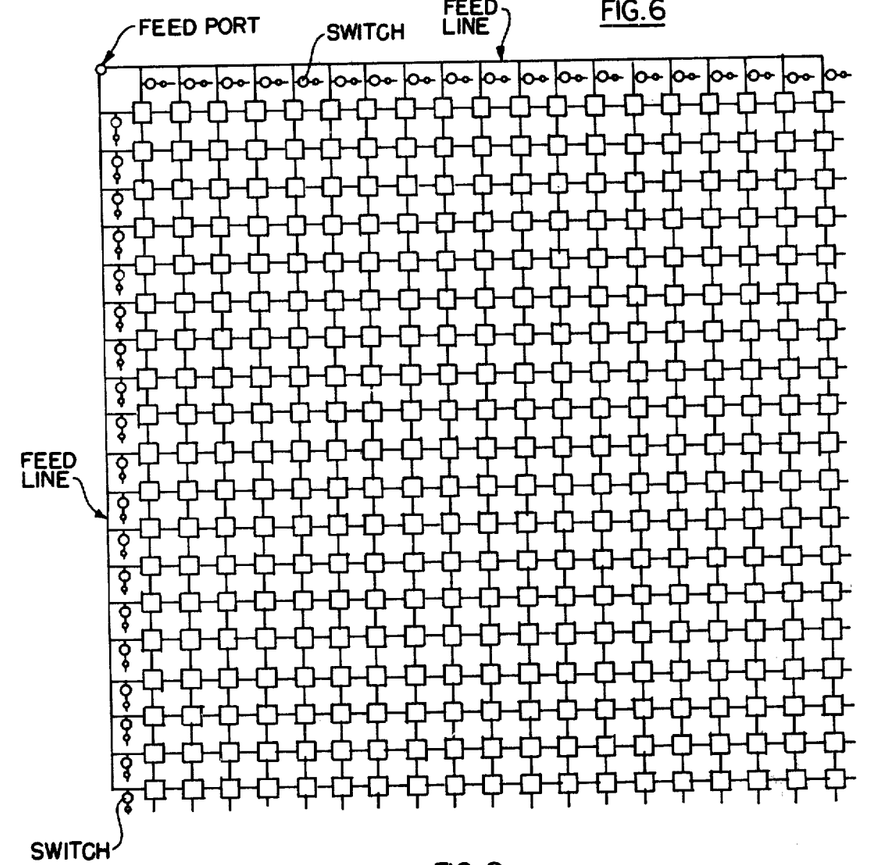
FIG. 6 is a schematic representation of a transmitting antenna array which may be constructed to be susceptible of two orthogonal scanning processes to constitute the two transmitting antenna arrays of the attachment of the invention.
Figure 8:
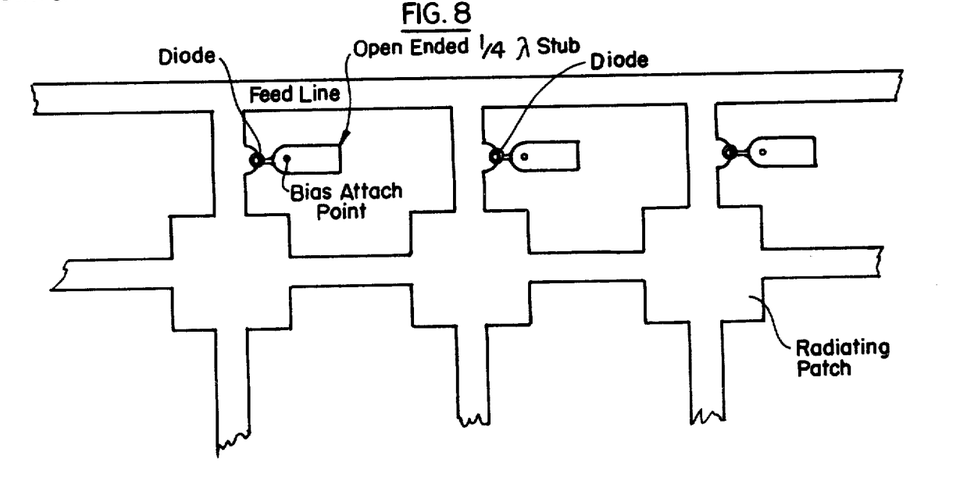
FIG. 8 is a schematic representation of the switching configuration for the array of FIG. 6.

As shown in FIG. 6, the two sets of transmitting antenna arrays of the attachment may be formed by a plurality of microstrip radiating patches interconnected by microstrip lines and switched by means of shunt semiconductor switches, in the form of diodes (FIG. 8). Using square resonant patches with orthogonal feed points allows aperture sharing by the two orthogonal sets. The size of the individual patches is approximately one-half wavelength in dielectric, and the length of the connecting lines is also one-half wavelength in dielectric.

Figure 7:
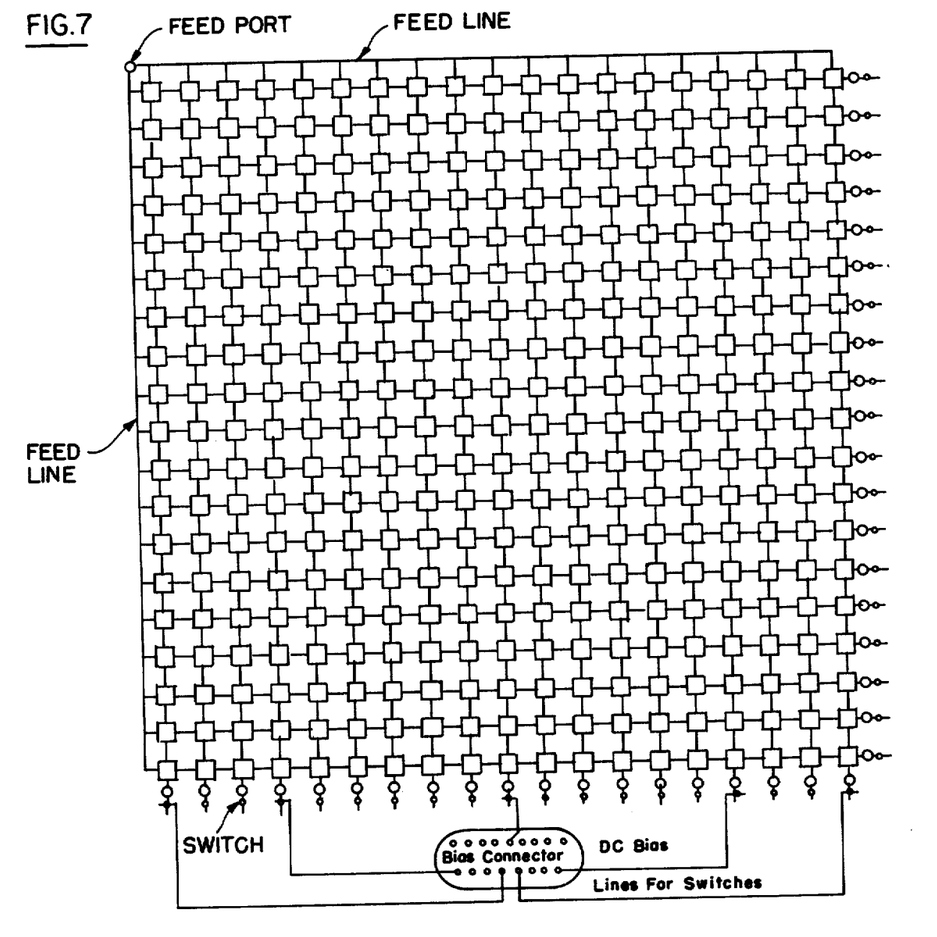
FIG. 7 is a schematic representation of a second array, representing a variation of the array of FIG. 6.

A variation of the antenna array of FIG. 6 is shown in FIG. 7. The difference between the arrays of FIGS. 6 and 7 is in the location of the switches. In FIG. 6, shunt switches are used which are one-quarter wavelength from the main feed line and one-quarter wavelength from the first patch. In the blocking mode each switch presents a short-circuit in parallel with the point it is connected to in the array. This appears as an infinite impedance in shunt with the main feed line. In the passage mode, the switch presents a high shunt impedance and allows energy to pass the array.

Figure 9:
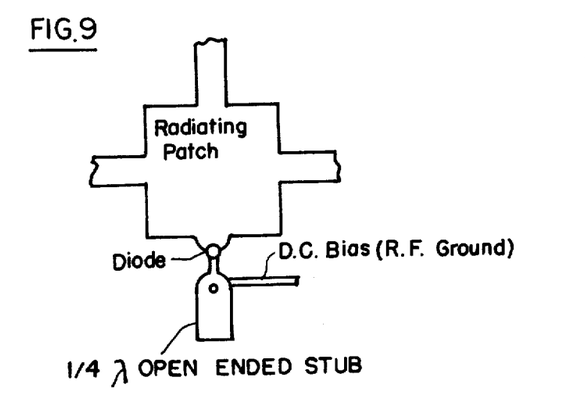
FIG. 9 is a schematic representation of the switching configuration for the array of FIG. 7.

The switches for the embodiment of FIG. 7 present their short-circuit state in parallel with the array impedance, effectively producing a high shunt impedance to the main feed line. When in a high impedance state, the effective impedance seen by the feed line is the array impedance and it is then coupled to the array. The advantage of the embodiment of FIG. 7 over the embodiment of FIG. 6 is that the antenna array in the embodiment of FIG. 7 can be printed with the required DC bias lines in one step. A disadvantage of the embodiment in FIG. 7 is that the short-circuited propagated from each switch to the feed line is degraded by line losses. Typical switch configurations for both the embodiments of FIGS. 6 and 7 are shown respectively in FIGS. 8 and 9.

The invention provides, therefore, an attachment for particular use in helicopters, for permitting microwave interference pattern sensor systems to sense low velocities encountered when the helicopter is in a hover mode, and to produce, for example, control signals for the auto pilot of the helicopter. As described above, the attachment includes a scanned antenna array which simulates motion of the helicopter at low velocities, so that the MIPS system is capable of producing appropriate outputs at the low velocities.

It will be appreciated, of course, that while particular embodiments of the invention have been shown and described, modifications may be made. It is intended in the claims to cover the modifications which come within the spirit and scope of the invention.

What is claimed is:

1. In a microwave interference pattern velocity sensor system in which the movement of the velocity sensor is employed to determine velocity of the vehicle in which said sensor is mounted, a combination for enabling the system to sense low velocity, said combination including:
    an antenna array comprising a plurality of antenna elements, and
    means coupled to said antenna elements for sequentially exciting said elements at a particular frequency so as to simulate motion of the array along a particular axis.

2. The combination defined in claim 1, in which said antenna assembly comprises a plurality of transmitting antenna elements, and in which said exciting means causes said antenna elements to produce an energy pattern which moves even though the antenna array is stationary.

3. The combination defined in claim 2, and which includes receiving antenna means positioned to intercept the energy pattern.

4. The combination defined in claim 1, and which includes frequency modulating means coupled to said exciting means for frequency modulating the particular frequency at which the exciting means is operated.

5. The combination defined in claim 1, in which said antenna elements comprise a plurality of apertured transmitting antenna horns.

6. The combination defined in claim 5, in which said antenna horns are elongated, and are spaced and parallel to one another to extend perpendicularly to the scanning axis.

7. The combination defined in claim 2, in which said antenna spray is formed of a plurality of rectangular radiating patches, and a plurality of interconnecting lines.

8. The combination defined in claim 7, in which said patterns are square and have a size of approximately one-half wavelength in dielectric.

9. The combination defined in claim 2, in which said interconnecting lines each have a length of one-half wavelength in dielectric.

10. The combination defined in claim 2, and which includes a plurality of switching means connected to said interconnecting lines.

11. A microwave interference pattern velocity sensor system in which the movement of the velocity sensor antenna means is employed to determine velocity of the vehicle in which said sensor is mounted, a combination for enabling the system to sense low velocity, said combination including:
    a transmitting antenna array comprising a plurality of antenna elements,
    exciting means coupled to said transmitter elements for sequentially exciting said elements at a particular frequency,
    a receiving antenna positioned along a particular axis relative to said transmitting antenna array for intercepting the return energy pattern,
    frequency modulating means coupled to said exciting means for frequency modulating said particular frequency so as to simulate motion along a particular axis.

12. The combination defined in claim 11 in which said antenna elements comprise a plurality of elongated apertured transmitting beams that are spaced from and parallel to one another to extend perpendicularly to said particular axis.

13. The combination defined in claim 11 in which said antenna array comprises a plurality of rectangular radiating patches, a plurality of interconnecting lines each of which having a length of one-half wavelength in dielectric, and in which said energy patterns are square and have a size of approximately one-half wavelength in dielectric.

14. The combination defined in claim 11 comprising:
    separate antenna means for detecting velocity along a heading and a cross-heading course, and
    antenna switch means for selecting said separate antenna and for selecting said transmitter comprising a plurality of antenna elements for simulating motion along a particular axis whereby said sensor is capable of sensing the velocity of the stationary and forward movement of the vehicle in which it is mounted.

* * * * *